United States Patent [19]

Nelson

[11] Patent Number: 5,105,207
[45] Date of Patent: Apr. 14, 1992

[54] SYSTEM AND METHOD FOR ACHIEVING GRAY SCALE DMD OPERATION

[75] Inventor: William E. Nelson, Dallas, Tex.

[73] Assignee: Texas Instruments Incorporated, Dallas, Tex.

[21] Appl. No.: 636,056

[22] Filed: Dec. 31, 1990

[51] Int. Cl.$^5$ .............................................. G01D 15/14
[52] U.S. Cl. ...................................... 346/160; 355/229; 358/474; 101/DIG. 37
[58] Field of Search ............................ 346/160, 153.1; 355/233, 229; 358/474, 475; 101/DIG. 37

[56] References Cited

U.S. PATENT DOCUMENTS 4,942,407 7/1990 Tadokoro ........................ 346/160 X
5,028,939 7/1991 Hornbeck et al. ................... 346/160
5,051,757 9/1991 Hasagawa ........................ 346/160 X Primary Examiner—R. L. Moses
Attorney, Agent, or Firm—Julie L. Schneider; James C. Kesterson; Richard L. Donaldson

[57] ABSTRACT

There is disclosed a system for enhancing resolution of a xerographic process by submodulation of each individual pixel. The submodulation is achieved by anamorphically reducing the square pixel presentation of light rays to a rectangle having a number of controllable segments within each square pixel scan line. By controlling the presentation of light rays to selected segments within each pixel gray scale an enhanced resolution can be achieved.

41 Claims, 2 Drawing Sheets

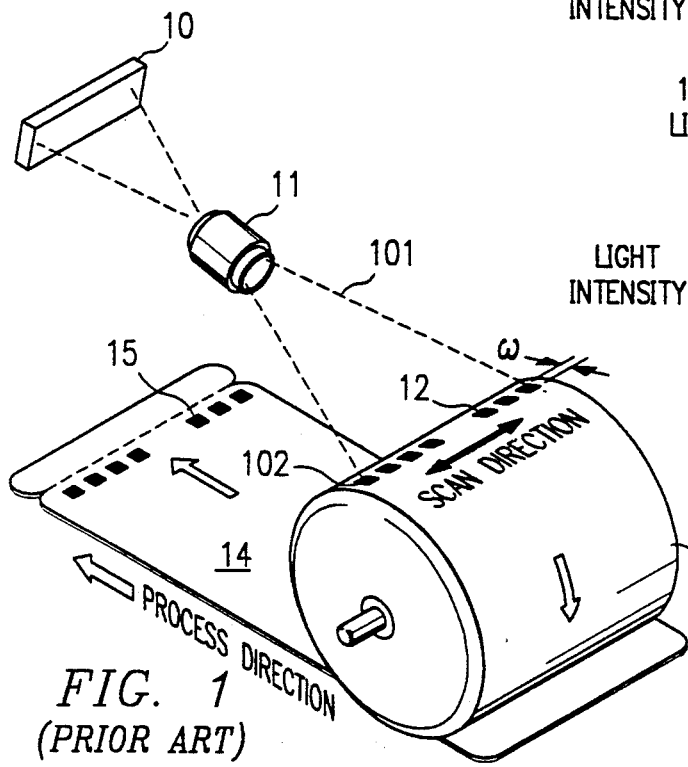
FIG. 1 (PRIOR ART)
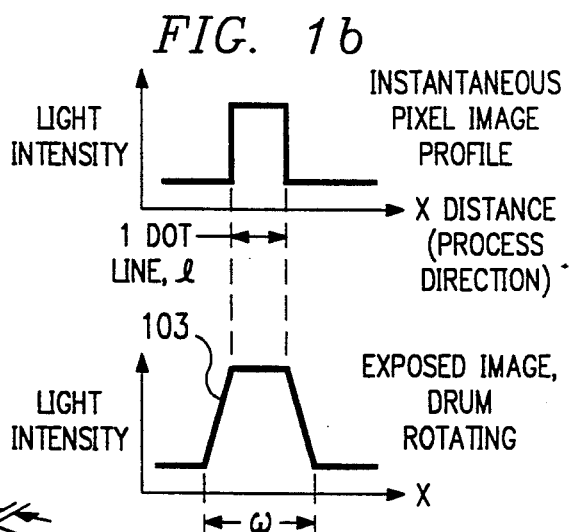
FIG. 1b
FIG. 1a
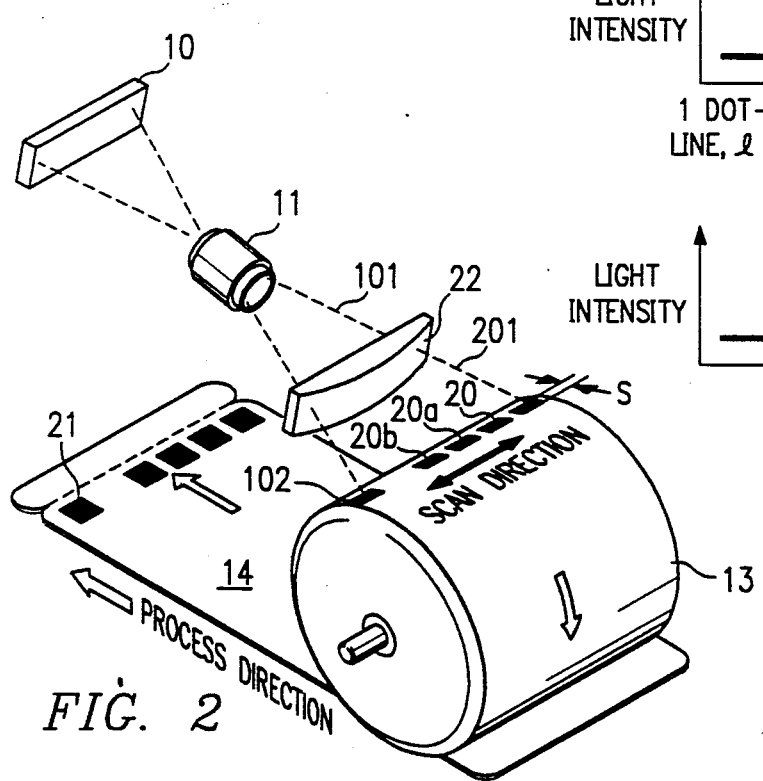
FIG. 2
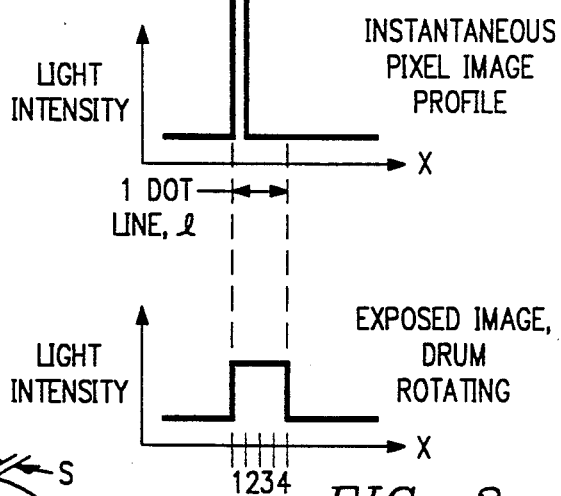
FIG. 2b
FIG. 2a

SYSTEM AND METHOD FOR ACHIEVING GRAY SCALE DMD OPERATION

TECHNICAL FIELD OF THE INVENTION

This invention relates to a DMD device and more particularly to illumination systems which allow for gray scale operation.

BACKGROUND OF THE INVENTION

The use of semiconductor light modulators is gaining in popularity as a replacement for the laser polygon scanner in xerographic printing processes. A technology of preference, due to its monolithic, semiconductor fabrication process, is the deformable mirror device (DMD). Copending patent application entitled "Spatial Light Modulator Printer and Method of Operation," Ser. No. 07/454,568, assigned to the common assignee with this patent application, which patent application is hereby incorporated by reference herein, discusses one embodiment of a DMD device using a tungsten light focused via optics on a DMD array. While the invention in that application functions very well, several areas of improvement have become apparent.

One such improvement would be to provide gray scale operation. Existing DMD devices are either on or off. That is, the modulated light is either directed (for a particular pixel) onto the imager lens aperture or it is not. This results from the fact that the individual mirrors are either deflected (tilted) by an address signal, or on, or they are entirely off, that is, directed away from the imager lens. Half tones and gray scale then cannot easily be achieved because of the digital nature of the DMD addressing process.

The problem is further compounded by the fact that in an array all of the pixels that are supposed to rotate from a given point in time do so at the same time. Thus, to achieve gray scale operation, several registers must be provided for each DMD pixel and adequate time must be allowed for the pixels to return to their off state between operations. This is a complicated task at best.

Accordingly, it is a problem to provide gray scale, or tonal levels between black and white using DMD devices in existing systems.

A further problem is that when printing on moving media the first part of the media passing under a rotated (on) pixel receives relatively less light than a later part of the media, and thus, uneven exposure results within a single line of exposure, or at the leading and trailing edges of wider areas of exposure.

SUMMARY OF THE INVENTION

In the current invention, the physical image of the pixel is anamorphically magnified, or is spherically magnified and subsequently is "compressed" in the process direction, resulting in the exposure energy per unit area at the image becoming accordingly higher. The resulting rectangular image of the pixel formed is much sharper in the process direction than that achieved when the spherically magnified square pixel image is presented to the photoreceptor. Resolution across the photoreceptor (scan direction) is unchanged, as determined by the total number of DMD pixels.

Thus, an anamorphic magnification of the DMD pixels, by an imager system with a net differing power in the vertical and horizontal axes of the DMD chip frame of reference, results in a rectangular image of a DMD pixel at the photoreceptor and serves to substantially sharpen the printed line image produced, as hereinafter described.

Finally, with the anamorphically imaged (rectangular image of pixel) DMD pixel, the selective modulation (on-and-off switching) of a DMD element within the line-time nominally associated with typical 300 line-per-inch printer resolution exposure process can give the effect of higher resolution (more lines-per-inch) in the process direction. This cannot be achieved with the presentation of a square pixel image at the photoreceptor.

Using this structure and method, it is possible to break each line time into multiple segments, and during each segment, operate the solid state DMD array in the conventional digital (on, off) mode previously described. Thus, by controlling how long a DMD pixel is rotated, which is the result of controlling exactly when in each line time the pixel is rotated, different amounts of light are passed from the pixel to the media thereby resulting in gray scale operation. The amplitude of the light energy delivered at each pixel is precisely varied by controlling the on-time of each DMD pixel. This process is called pulse-width modulation, PWM.

A further refinement of the concept would be to tune the light intensity of each segment of the light modulator to the particular optical system in accordance with the system's light transmission characteristics, thus using the DMD's PWM feature to correct for optical deficiencies. A further refinement would be for the end user to adjust the uniform exposure characteristics to the light sensitive media type per-se, using the DMD feature of PWM, as, for example, to correct for variations of spectral intensity in a color printing system.

Another technical advantage of this invention is to make the focal character of the DMD image at the photoreceptor narrower in the drum rotation direction than the width of the full-sized projected pixel, forming a rectangular area of illumination. Thus, as the drum is rotated under the presented image, and the modulated image remains active for the same line-time, a "square" full-size printed image of the pixel is achieved, but with substantially sharper leading and trailing edges than in the case of square pixel image presentation.

It is another technical advantage of this invention to provide a controllable light source for use in conjunction with a DMD device such that the light intensity can be controlled to different levels within each line time. The individual pixels could then be controlled to rotate at the proper time within the line to effect the transfer of light at selected levels of intensity thereby yielding gray tones.

It is a further technical advantage of this invention that the light intensities within a time frame can be made variable and end user controllable without the complexity of changing the rotation times within each frame period of each DMD pixel, since the most efficient DMD operation results when all DMD pixels are reset in parallel.

A still further technical advantage of the invention is the adaption of an anamorphic projection of a square xerographic DMD pixel into a rectangular presentation to a rotating xerographic drum and the subsequent division of the pixel within the rotational one dot line into a number of controllable periods, thereby achieving gray scale printing. Merely fabricating a rectangular DMD pixel, and imaging it to the drum with conventional spherical optics, would result in substantially reduced exposure energy, whereas the proposed system benefits from the full energy impinging on the larger mirror area of a DMD pixel that is magnified spherically, and is one or more effective dot lines "wide" in the "process" (drum) direction at the DMD chip per-se.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIG. 1 shows a prior art xerographic printing process;

FIGS. 1a-1b show ideal versus actual exposure profile of a particular pixel of FIG. 1;

FIG. 2 shows an anamorphic pixel image printing process of the current invention;

FIGS. 2a-2b show exposure profiles of a particular pixel of FIG. 2;

DETAILED DESCRIPTION OF THE INVENTION

Figure 3:
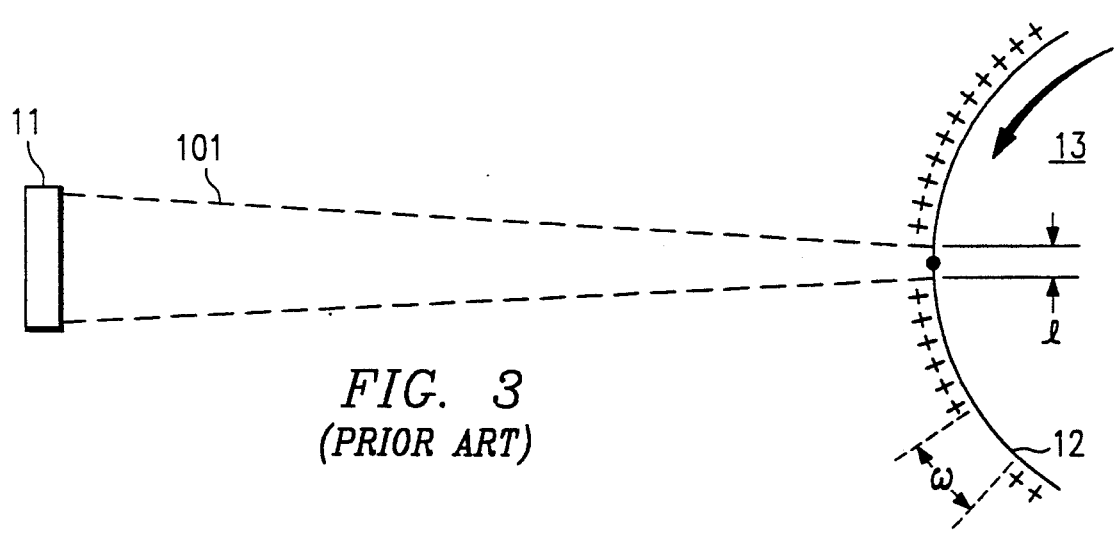
FIG. 3 shows a conventional ray bundle impacting a photoreceptor drum.

FIG. 1 shows a conventional xerographic printing process using a DMD light modulator without the illumination source. It should be noted that the illumination source can be either incandescent, arc or solid-state, with the preferred embodiment being a solid state LED array.

In FIG. 1 DMD 10 presents a modulated image to image lens 11 which diverges as ray bundle 101 to expose a pixel line 102 of width w on rotating photoreceptor 13. The scan direction is referred to as the width of DMD exposure line 102. The process direction is shown by the arrow on both the photoreceptor and underneath on the printed stock and is the direction of interest in this particular disclosure, i.e., the direction that the pixel is compressed. A full discussion of the operation of DMD printers will not be given here, but the reader is referred to the above-mentioned application entitled "Spatial Light Modulator Printer and Method of Operation" for complete details.

The pixel line width, w, refers to FIG. 1a where there is shown a typical light intensity profile which would occur in the process direction forming a dot line of width 1. FIG. 1b shows the instantaneous pixel image profile. However, since the drum is moving underneath, the profile of FIG. 1b is broadened and softened so that the transition from zero exposure to full exposure is relatively wide and thus the edges are fuzzy. The full width is w, as shown in FIG. 1a, so w is greater than 1 due to the rotating drum. The fuzzy edge is a result of the motion of the photoreceptor and is one of the problems eliminated in the present invention.

As shown in FIG. 1a, edge 103 indicates the fuzzy edge on the exposed pixel, which is a region where the pixel is going from white to black and is essentially an uncontrolled gray transition region.

FIG. 2 shows the preferred process and system of the invention. Again, DMD 10, the light source (not shown) and imager 11 can remain the same as in FIG. 2. Imager 11 is modified, either by the introduction of cylindrical lens 22 downstream, or possibly by modification of the imager lens per se to accomplish the anamorphic function. As envisioned, however, it is desirable to have a spherical imager lens and use an anamorphic rod lens downstream to eliminate most alignment problems.

Ray bundle 101, the conventional ray bundle, is compressed by lens 22 to ray bundle 201 which then falls on line of exposure 102 of photoreceptor 13 to form a series of pixels along line 102 of width s where s is less than 1. These pixels are indicated as 20, 20a and 20b. Printed pixel line 21 is of width 1, the result of a sequentially exposed line image on drum 13.

FIG. 2a shows an exposed image pixel with a drum rotating with exposed intensity profile having square edges and a uniform exposure (flat top) and no gray side walls as was the case in FIG. 1a. This, then, essentially forms a true dot line of width 1 which consists of four (or more if desired) subsegments of width s which is the instantaneous pixel profile image, as shown in FIG. 2b. Light intensity, as shown in FIG. 2b, is brighter or higher than as shown in FIG. 1b because the light energy is compressed into a narrower area s. However, when drum 13 rotates underneath, the effective exposure time of light rays 201 is one-fourth as much. Thus, the integrated light intensity profile in FIG. 2b is comparable to that in FIG. 1b, i.e., the same exposure levels are achieved even though exposure time per unit area is shorter. This results in a sharper, more uniform pixel image on the photoreceptor.

FIG. 3 shows a side view in the direction or area, of interest of the ray bundle in a conventional system. Ray bundle 101 is shown as converging onto photoreceptor drum 13 to form a square pixel image of width 1 at any instantaneous point in time.

As photoreceptor drum 13 rotates in the process direction underneath that exposure area, it will produce an exposed pixel 12 of width w. Shown on the top of photoreceptor 13 is the discharged region of the previously exposed dot line, 12, while a new dot-line is forming.

Figure 4:
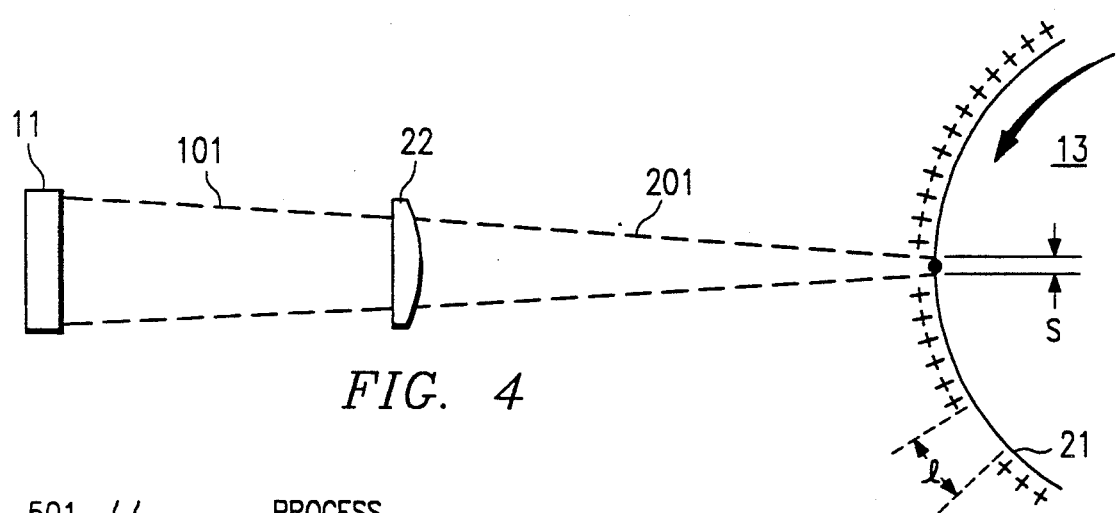
FIG. 4 shows a compressed ray bundle of the current invention impacting a photoreceptor drum.

FIG. 4 shows the preferred embodiment where ray bundle 101 is compressed in the process direction into ray bundle 201. Imager 11, in conjunction with anamorphic lens 22 (or by itself), performs this compression in the process direction but not in the scan direction. Ray bundle 201 is the compressed image falling onto photoreceptor 13 instantaneously illuminating a compressed width of s (as shown in FIG. 2b).

Subsequently, photoreceptor drum 13 rotates underneath that compressed image and forms an exposed pixel having width 1, i.e., the desired pixel, or line, width, 21. In this situation 1 is narrower than w, but wider than s.

Continuing on, FIGS. 3 and 4, the unexposed areas, are shown as having a positive charge on the surface of photoreceptor 13. When the light hits photoreceptor 13, the exposed regions are discharged to form the latent image of the desired image.

Figure 5:
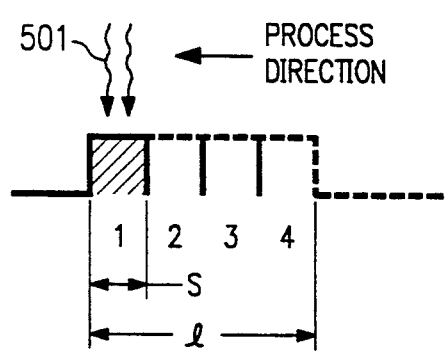
FIG. 5 shows a profile, in schematic form, of a pixel modulated into four sections.

Turning to FIG. 5, there is shown the segmented pixel exposure profile relating back to FIG. 2a. In the process direction there is shown a ray bundle of light coming into region s, arrows 501 indicate light rays falling onto segment 1 which is cross hatched to show that it is exposing segment 1, but not segments 2, 3 and 4. The width s is being exposed at this instant in time.

Segments 2, 3 and 4 of the pixel are waiting to be exposed and they are therefore shown as dotted lines. The width 1, which is the combination of all four segments, will be the final exposed pixel profile.

Figure 6:
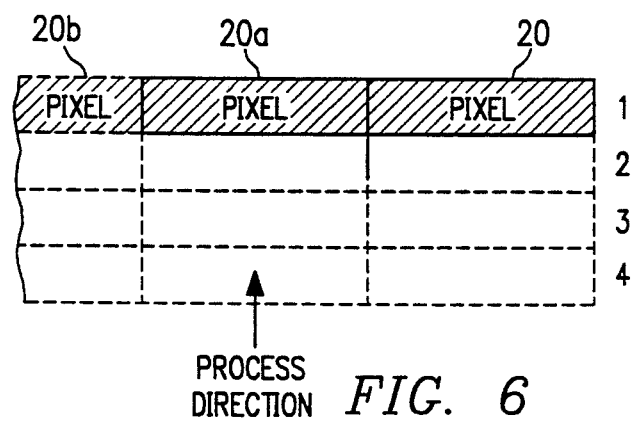
FIG. 6 shows a top view of adjacent exposed pixels under exposure conditions of FIG. 5.

In FIG. 6, there is shown the top view relating back to pixel line 102 of FIG. 2. Thus, looking down on the exposure process from the direction of the incoming light, there can be seen a superposition of adjacent pixels 20, 20a and 20b in the scan direction, which will be proceeding around the photoreceptor drum surface at the point of exposure. As shown, at this point in time segment 1 is being exposed. At the next instant of time segments 2, 3 and 4 will (or will not) be exposed on this particular pixel line.

Thus, as shown in FIGS. 5 and 6 with the anamorphic compression of the pixel, a given pixel is divided into any number of (for example, four) segments as shown in this particular description. Therefore, the pixel could be compressed into more than one-fourth of the height of the normal pixel or less, and could be segmented as much as desired. The advantage this system gives is that those segments can be exposed or not exposed in a very precisely controlled fashion. Thus, each segment can be thought of as controlled by a binary bit having a condition of 1 or 0 corresponding to black or white.

Therefore, within a given square DMD pixel, the combinations of the bits can be varied and a total of sixteen gray levels achieved. Thus, in the simplest case, 1 can be turned on, 2, 3 and 4 left off or 1 and 3 can be turned on, and the others left off, etc. Using this arrangement of subpixel modulation, one can achieve a very precise and repeatable gray scale result. Thus, by going into a pixel and by submodulating, that is, turning on and off various portions of it, there can be achieved different apparent charge levels to the latent electrostatic image on the drum. This will then result in various different levels of black (gray) to print on the print media after the developer process.

The system then can be controlled by a microprocessor (not shown) so that any pixel can be more charged, or more discharged, depending upon what sequence the processor system chooses to submodulate the individual pixel segments. If more resolution is desired, then the system can be divided into eight segments or perhaps sixteen. Four segments is a selected number because it is compatible with the address structure on the DMD, and also allows a reasonable resolution to achieve gray scales at sixteen levels without excessive memory requirements.

Within a scan line, each pixel can be treated independently to achieve any level of gray at any pixel location, i.e., pixel 20, 20a or 20b. Thus, instead of each pixel just being binary 1 and 0, black and white, each pixel can now become a miniature detailed image. This would be advantageous for everything from the rendering of a gray scale photograph to very high resolution graphics that require fine line detail. At lower bits per pixel levels, this system could perform simple functions like anti-aliasing slanted lines, and detail enhancement on seraph typefaces. Gray scale for pictorial images is possible as is treatment of line images and character images for the appearance of a higher resolution process than typically delivered by a 300 line per inch polygon scanner system.

In generic terms this type of process is now termed resolution enhancement, which is the ability to make the system appear to be a high resolution printer even though it is still running at a lower resolution (e.g. 300 dots per inch). For example, as discussed above, it was shown that this system rendered the 300 dot per inch lines with very sharp edges which was not possible with the prior process. By sub pixel modulation, the system allows a resolution of 300 dots per inch to achieve true pictorial gray scale on a pixel-by-pixel basis, thereby avoiding the complexity and the visual artifacts experienced when resorting to dithering techniques as is in the prior art.

While it has not been shown in detail, the modulation of the light within the segments can be achieved either by controlling the rotation of the pixel to direct the light for longer or shorter periods, or by pulsing the light on and off within a scan line. The pixel rotation method will more easily allow for control of the resolution in the process direction on a pixel-by-pixel basis, while the source modulation technique will be combined for spot modulation along the entire scan line. Such a light source could be, for example, as shown in concurrently filed, copending patent application entitled "System and Method for Solid State Illumination for DMD Devices," Ser. No. 636,651, which application is hereby incorporated by reference herein. Such a light source could cycle among different power levels within a pixel line to achieve enhancement effects perpendicular to the process direction.

Although this description develops the invention with reference to the above specified embodiments, the claims and not this description limited the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A xerographic system where pixel images from a light source are achieved on a moving photoreceptor across a scan row, the system comprising:

a modulator for modulating said light source to establish each of said pixel images within said scan row; and a segmenter for subdividing each said pixel into segmented time periods; said segmenter including:

an anamorphic light source optic control for compressing modulated light pixels in the direction of movement of said photoreceptor while allowing said modulated light pixels to impact said photoreceptor across said scan row without compression.

2. The system set forth in claim 1 wherein said anamorphic optics includes an imager lens and an anamorphic lens.

3. The system set forth in claim 1 wherein said imager lens includes an anamorphic configuration integral thereto.

4. The system set forth in claim 2 wherein said segments, are created in the direction of movement of said photoreceptor, and wherein said system further comprises:

control circuitry for providing modulated light during selected ones of said segments of said segmented time period.

5. The system set forth in claim 4 wherein said control circuitry includes:

circuitry for periodically operating said modulator during each pixel modulation time period.

6. The system set forth in claim 2 wherein said modulator is a DMD having at least one row of selectively moveable elements, each controlling a single pixel image at the photoreceptor.

7. The system set forth in claim 6 wherein each said element of said DMD is individually controllable during each said segmented period.

8. The system set forth in claim 6 wherein said light source has selectively controllable light intensity levels.

9. The system set forth in claim 8 wherein said light source is individually controllable with respect to segments of said DMD.

10. The method of creating gray scale on a printed medium using a xerographic process wherein a modulated light source forms individually controllable pixel images on a rotating photoreceptor, said method including the steps of:

presenting said modulated light as individual pixels to said photoreceptor across a row; and compressing said modulated light pixels in the direction of rotation of said drum while allowing said light pixels to impact said drum across said row without compression.

11. The method set forth in claim 10 wherein said compressing step includes the step of:

focusing said light pixels through an anamorphic lens.

12. The method set forth in claim 11 further comprising the step of:

dividing each said pixel row into a series of segments in the direction of said rotation of said photoreceptor.

13. The method set forth in claim 12 further comprising the step of:

selectively enabling each said pixel during any of said segments.

14. The method set forth in claim 12 further comprising the step of:

selectively enabling said light source during any of said segments.

15. The method set forth in claim 10 wherein said modulating step includes the step of:

presenting said light source to a DMD having individually controllable elements, each element operable to modulate one pixel.

16. A method of creating a xerographic printing process where pixel images from a light source are achieved on a moving photoreceptor across a scan row, the method comprising the steps of:

modulating said light source to establish each of said pixel images in each said scan row; and subdividing each said pixel into segmented time periods, said segmenter including:

compressing modulated light pixels in the direction of movement of said photoreceptor while allowing said modulated light pixels to impact said photoreceptor across said scan row without compression.

17. The method set forth in claim 16 wherein said compressing step includes the step of:

passing said light pixels through an anamorphic lens.

18. The method set forth in claim 17 wherein said segments are created in the direction of movement of said photoreceptor, and wherein said method further comprises the steps of:

providing modulated light during selected ones of said segments of said segmented time period.

19. The method set forth in claim 18 wherein said method further includes the step of:

periodically operating said modulator during each pixel modulation time period.

20. The method set forth in claim 16 wherein said modulating step includes the step of:

impacting said light source on elements of a DMD having at least one row of selectively moveable elements, each controlling a single pixel.

21. The method set forth in claim 20 wherein each said element of said DMD is individually controllable during each said segmented period.

22. The method set forth in claim 21 wherein said light source has selectively controllable light intensity levels.

23. The method set forth in claim 22 wherein said light source is individually controllable with respect to segments of said DMD.

24. A DMD system comprising:

a light source;

a DMD array of pixels, each pixel being rotatable to focus light from said light source onto a medium for a time period;

a system for dividing each said time period into segments.

25. The system set forth in claim 24 wherein said medium is rotating in a process direction and wherein said dividing system includes:

focusing said DMD pixel elements via an anamorphic lens such that said light from said DMD pixels is compressed at said medium in said process direction while remaining uncompressed with respect to pixels across a row of pixels focused on said medium.

26. The system set forth in claim 25 further comprising:

a system for operating each said pixel for selecting intervals during each said time period.

27. The system set forth in claim 26 wherein said dividing system includes:

a system for varying the timing of said segments.

28. The system set forth in claim 25 wherein said light source has a selectively controllable light level.

29. The system set forth in claim 28 wherein said light source can be illuminated to a selected level during each said segment.

30. A xerographic system where pixel images from a light source are achieved on a moving photoreceptor across a scan row, the system comprising:

a modulator for modulating said light source to establish each of said pixel images within said scan row; and a segmenter for subdividing each said pixel row into segmented time periods; said segmenter including a selectable controllable light source operable for changing the light intensity in accordance with said segmented time periods.

31. The system set forth in claim 30 wherein said segments are created in the direction of movement of said photoreceptor.

32. The system set forth in claim 31 further comprising control circuitry for providing modulated light during selected ones of said segments of said segmented time period.

33. The system set forth in claim 32 wherein said control circuitry includes:

circuitry for periodically operating said modulator during each pixel modulation time period.

34. The system set forth in claim 30 wherein said modulator is a DMD having at least one row of selectively moveable elements, each controlling a single pixel image at the photoreceptor.

35. The system set forth in claim 34 wherein each said element of said DMD is individually controllable during each said segmented period.

36. The system set forth in claim 30 wherein said light source is individually controllable with respect to segments of said DMD.

37. The method of creating gray scale on a printed medium using a xerographic process wherein a modulated light source forms individually controllable pixel images on a rotating photoreceptor, said method including the steps of:

presenting said modulated light as individual pixels to said photoreceptor across a row; and having the intensity of said light source in concert with the rotation of said photoreceptor.

38. The method set forth in claim 37 further comprising the step of:

dividing each said pixel row into a series of segments in the direction of said rotation of said photoreceptor.

39. The method set forth in claim 38 further comprising the step of:

selectively enabling each said pixel during any of said segments.

40. The method set forth in claim 38 further comprising the step of:

selectively enabling said light source during any of said segments.

41. The method set forth in claim 37 wherein said modulating step includes the step of:

presenting said light source to a DMD having individually controllable elements, each element operable to modulate one pixel.

* * * * *